United States Patent
Reynolds et al.

(10) Patent No.: US 6,491,312 B2
(45) Date of Patent: Dec. 10, 2002

(54) SCOOTER STEERING CONTROL

(76) Inventors: Timothy C. Reynolds, 11645 Wilshire Blvd., Suite 1090, Los Angeles, CA (US) 90025; Keyvan T. Diba, 11841 Goshen Ave. #4, Los Angeles, CA (US) 90049

( * ) Notice: Subject to any disclaimer, the term of this patent is extended or adjusted under 35 U.S.C. 154(b) by 0 days.

(21) Appl. No.: 10/034,096

(22) Filed: Dec. 28, 2001

(65) Prior Publication Data

US 2002/0089138 A1 Jul. 11, 2002

Related U.S. Application Data

(60) Provisional application No. 60/256,726, filed on Jan. 5, 2001.

(51) Int. Cl.[7] .............................. B62K 21/18; B62M 1/00
(52) U.S. Cl. .................................... 280/87.041; 280/272
(58) Field of Search ..................... 280/89, 89.1, 87.021, 280/87.041, 268, 270, 271, 272

(56) References Cited

U.S. PATENT DOCUMENTS

| | | | | |
|---|---|---|---|---|
| 432,920 A | * | 7/1890 | Wittlig | 280/89.1 |
| 487,577 A | * | 12/1892 | Marthens | 280/89.1 |
| 579,664 A | * | 3/1897 | McConley | 280/271 |
| 4,120,514 A | * | 10/1978 | Sanders | 280/432 |
| 4,204,700 A | * | 5/1980 | Haines, Sr. | 280/432 |
| 4,714,261 A | * | 12/1987 | Kassai | 280/87.021 |
| 4,892,323 A | * | 1/1990 | Oxford | 280/272 |
| 5,505,493 A | * | 4/1996 | Camfiled et al. | 280/288.4 |
| 6,186,524 B1 | * | 2/2001 | McQueeny et al. | 280/87.021 |

* cited by examiner

*Primary Examiner*—Avraham Lerner

(57) ABSTRACT

A scooter steering control on small-wheeled scooter having a steerable front wheel on a handlebar, the control comprising two split sleeves fitted around the handlebar and the mounting tube on the scooter body, and a control pin slidable on the upper sleeve into and out of a recess on the lower sleeve. The recess has angularly spaced sidewalls forming stops for limiting turning of the front wheel. A spring-loaded latch holds the pin releasably in engaged and disengaged positions, and a second spring urges the pin toward the disengaged position.

7 Claims, 2 Drawing Sheets

SCOOTER STEERING CONTROL

REFERENCE TO PRIOR PROVISIONAL APPLICATION

This application claims the benefit of prior provisional application No. 60/256,726, filed Jan. 5, 2001, now abandoned.

BACKGROUND OF THE INVENTION

This invention relates to a safety device for small-wheeled vehicles, and relates more particularly to a safety steering control for the steerable wheel of a vehicle such as a scooter.

The current popularity of small-wheeled scooters such as the popular "RAZOR" brand of scooters has been accompanied by a substantial increase in the number of injuries resulting from accidents of various types. One type, in particular, is the so-called "jack-knifing" of the scooter when it is operating at high speed and, for various reasons, the front wheel is turned more sharply than the scooter can accommodate.

When the forward momentum of the scooter is very high, it may continue forwardly instead of turning with the wheel, and crimp the front wheel in a non-rotating, turned position, typically causing the scooter and its user to crash. At a lower level of excessive speed, this sometimes causes the occupant simply to lose steering control, sometimes with similar disastrous results.

SUMMARY OF THE INVENTION

The present invention resides in a steering control for the steerable wheels of scooters and other small-wheeled vehicles, which is adapted for easy installation on conventional scooters and, installed, is selectively engageable to provide safety control by limiting the angular steering motion of the front wheel to a restricted range that is much less likely to result in jack-knifing or other steering accidents. The control can be engaged in a quick and easy manner, and can be disengaged with equal ease so as to avoid interference with the full range of steering during low-speed operation.

For these purposes, the preferred embodiment of the invention comprises two relatively movable control elements for mounting on the support for the steerable wheel, typically the handlebar, and on the body of the scooter, and a selectively engageable and disengageable, motion-limiting coupling between the control elements that is operable, when engaged, to restrict relative turning of the elements, and thus of the handlebar, relative to the body, and limit such turning to the selected range. The control elements may be attachments that are installed as "after-market" add-ons, or may be built into the scooter by the manufacturer as "OEM" equipment.

More specifically, the preferred embodiment of the invention, shown in the drawings for purposes of illustrating the invention, comprises upper and lower attachments that are mounted, respectively, on the handlebar and on the body. These attachments are on the turnable handlebar post above the mounting tube on the front of the body, supporting the handlebar rotatably on the body, and on the mounting sleeve itself. These attachments are preferably tubular sleeves, each of which is longitudinally split or divided on one side for ease of mounting on the post and the mounting sleeve, and each preferably having a snap-locking, channel-shaped "keeper" that fits over outwardly extending ribs along the splits to hold the attachments securely in place. Both of the attachments and keepers may be relatively hard plastic such as polypropylene.

The motion-limiting coupling between the two attachments is formed by angularly spaced abutments on one of the attachments, herein opposite ends of a limiting recess in the lower one and a control member in the form of a pin mounted on the other attachment, preferably the upper one, to move longitudinally of the handlebar post into and out of the limiting recess. Conveniently, the attachment having the recess is positioned behind the handlebar mounting sleeve with the two abutments spaced equally to each side, and the control pin is positioned immediately behind the handlebar post and is centered in the recess in the straight-ahead steering position of the front wheel.

A selectively operable latch is provided to hold the control pin selectively in a raised, disengaged position and in a lowered, engaged position in which the lower end of the pin is in the recess. An optional second, wider recess may be provided above the first recess to provide a second, less limited steering range, the control pin being movable between two different engaged positions as well as a disengaged position. Another alternative embodiment forms the motion-limiting recess as a flexible rubber O-ring that is trapped in place in the lower attachment, thereby softening the limiting action of the steering control.

Other features and advantages of the invention will become apparent from the accompanying drawings.

DETAILED DESCRIPTION

Figure 1:
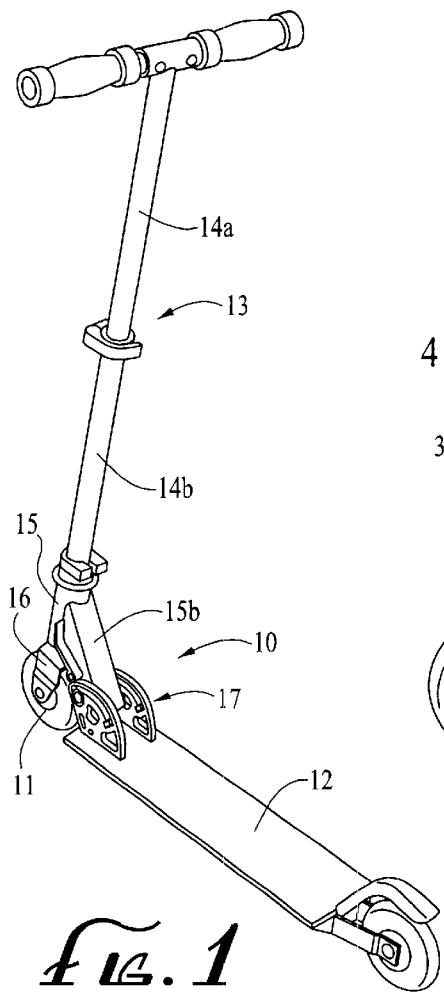
FIG. 1 is a perspective view of a representative scooter on which the present invention may be used.

Shown in the drawings for purposes of illustration is a conventional small-wheeled vehicle 10, specifically a scooter of the type sold under the "RAZOR" brand having small front and rear wheels 11 rotatably mounted on a body 12 forming the footrest of the scooter, and a steerable handlebar on the front end, indicated generally by the reference number 13. The handlebar has a conventional T-shaped upper portion with a depending post 14a that is telescoped into a tubular lower portion 14b permitting adjustment of the effective height of the handlebar.

The lower portion 14b of the handlebar post extends rotatably through a tubular mounting sleeve 15 supported on the front end of the scooter body 12 by an inclined front support 15b, and carries a wheel bracket or fork 16 on its lower end, rotatably mounting the front wheel 11. This wheel thus is steerable by turning the handlebar 13 in the mounting sleeve 15. A conventional folding hinge 17 is shown as the connection between the body 12 and the support 15b for the mounting sleeve 15, but this could be a non-folding connection as well.

Figure 2:
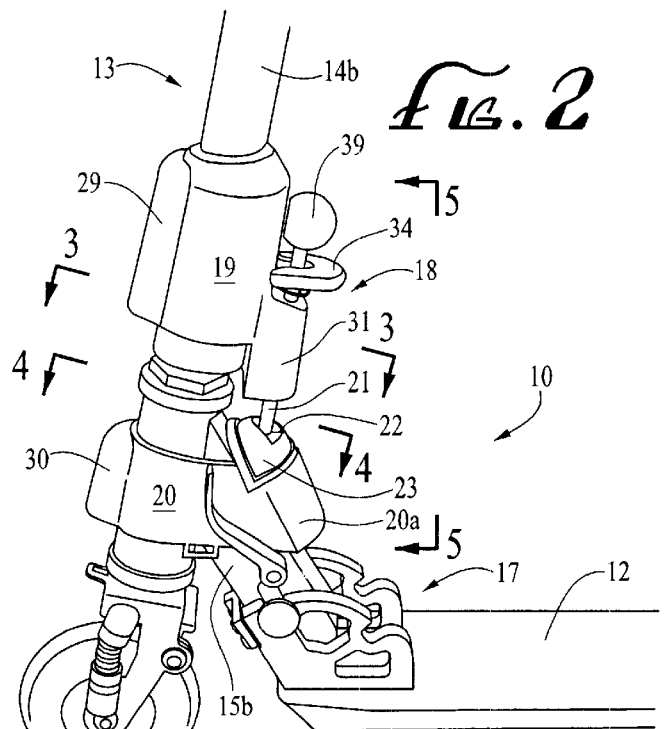
FIG. 2 is an enlarged fragmentary side elevational view of the front portion of the scooter of FIG. 1, with a steering control in accordance with the present invention installed on the scooter.
Figure 3:
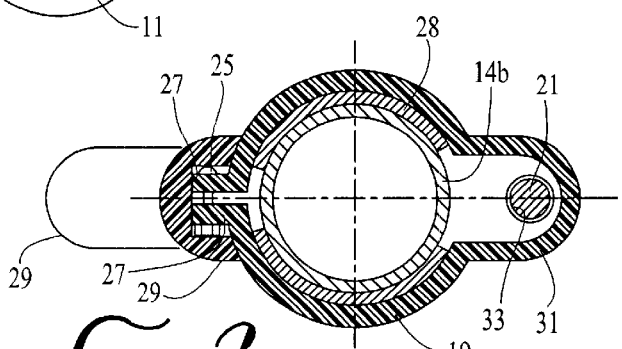
FIG. 3 is a further enlarged cross-sectional view taken along line 3—3 of FIG. 2.

In accordance with the present invention, a steering control, indicated generally by the reference number 18 in FIG. 2, is provided between the handlebar 13 and body 12, preferably at the handlebar mounting sleeve 15 which is fixed relative to the body. The steering control is selectively engageable to provide a motion-limiting safety control for the front wheel 11 of the scooter so that it cannot be turned, either intentionally or inadvertently, farther from the straight-ahead position than a preselected maximum amount in either direction. Moreover, the control can be disengaged quickly and easily so as to avoid interference with the full range of steering that sometimes is desirable, particularly during low-speed operation.

More specifically, and as shown in the first embodiment of the invention shown in FIGS. 2, 3, 4, 5 and 6, the steering control 18 comprises first and second control elements in the form of split sleeves 19 and 20 that are mounted respectively on the handlebar 13 and on the handlebar mounting sleeve 15 for relative rotation during turning of the steerable front wheel 11, and a motion-limiting coupling in the form of a control pin 21 that is slidably mounted on the upper control element 19 and has a depending free lower end that extends out of the upper element toward the lower element 20. Formed in the lower element is a control opening 22 that is angularly aligned with the pin when the front wheel 11 is in the straight-ahead position, and which receives the lower end portion of the pin when the latter is extended downwardly into an engaged position. This position is shown in the drawings.

In the illustrative embodiment, the control opening 22 is a recess in the upper side of an upward extension 23 of the lower control element 20, and has laterally spaced sidewalls 24 that are disposed on opposite sides of the extended control pin, and an open rear side. It can be seen in FIG. 4 that the sidewalls diverge toward the rear of the scooter 10, in planes generally lying on radii of the handlebar 13. Accordingly, as the handlebar turns the wheel in each direction, one of these sidewalls comes into flat engagement with the control pin 21 in the recess 22.

In the presently preferred embodiment shown in FIGS. 2 through 6, the split sleeves 19 and 20 of the control elements are fitted around the lower handlebar post 14b and the mounting tube 15, respectively, and are clamped tightly in place by nut-and-bolt fasteners 25 (see FIG. 3) in two longitudinal ribs 27 on the front side of each sleeve, along the longitudinal split therein. A spacer 28 is provided in each of the sleeves 19, 20 to be clamped by the sleeve against the tubular part on which it is mounted, for firm gripping engagement, and a channel-shaped cover 29, 30 is fitted over each pair of ribs 27 to provide a streamlined, finished look.

Figure 5:
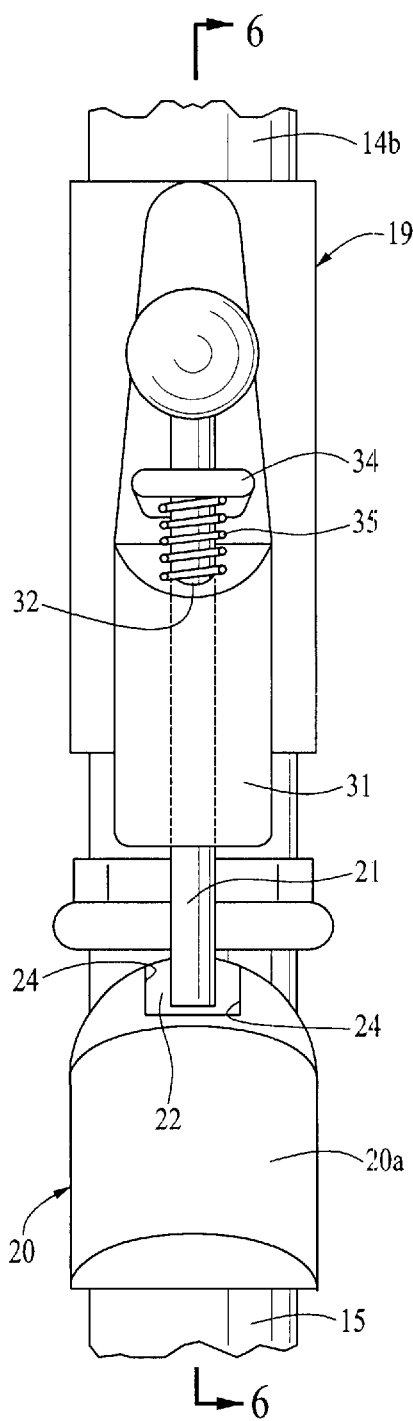
FIG. 5 is an enlarged fragmentary side elevational view of the control elements of the first embodiment, taken from the direction indicated by the arrows 5—5 in FIG. 2.
Figure 6:
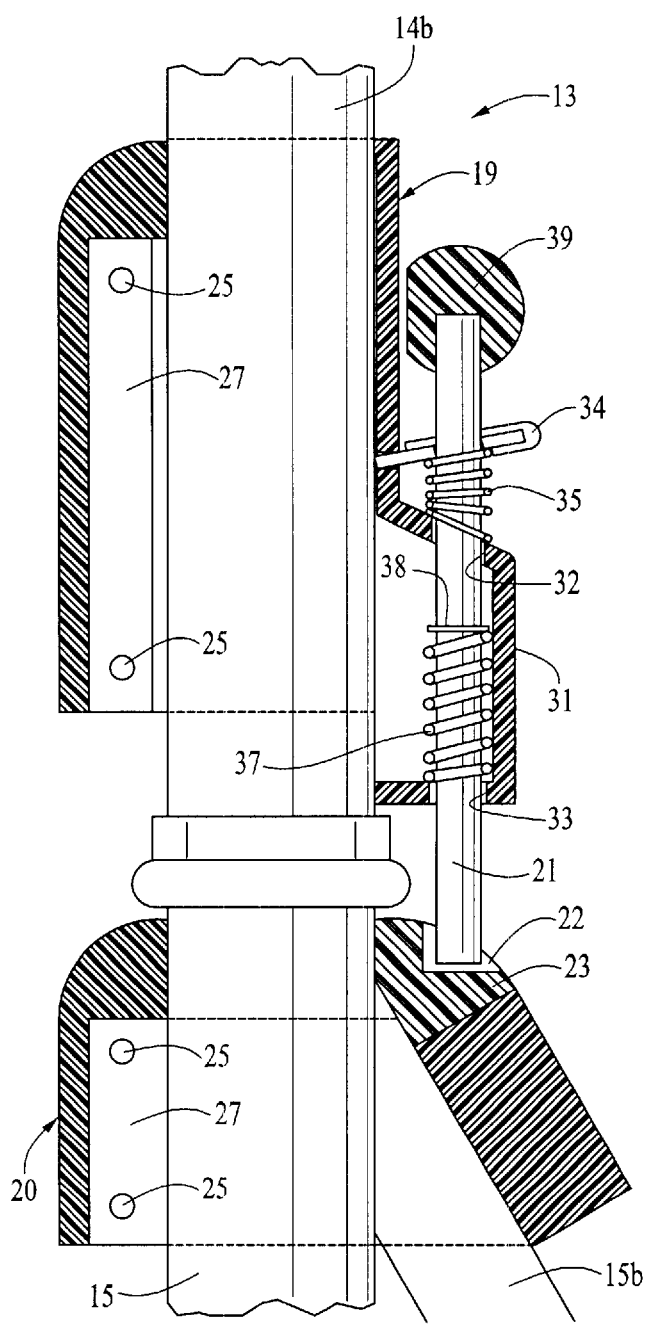
FIG. 6 is an enlarged partial cross-sectional view taken substantially along line 6—6 of FIG. 3.

As shown most clearly in FIGS. 5 and 6, the control pin 21 is mounted on a hollow housing 31 that is formed integrally as part of the upper sleeve 19, on its rear side opposite the ribs 27, and is slidable up and down in two aligned mounting holes 32 and 33 in the top and bottom walls of the housing. A slide latch 34 is pivotably mounted on the sleeve 19, above the housing 31, to hold the pin 21 releasably in different selected positions, the "engaged" position being shown in FIG. 6, and two coiled compression springs 35 and 37 are fitted around the control pin. One of these is disposed outside the housing between the top wall and the slide latch 34 to urge the latch upwardly into a "latched" condition, binding on and holding the pin 21. The other spring 37 is disposed inside the housing 31 and compressed between the bottom wall and a collar 38 on the pin, to urge the pin upwardly relative to the housing. With this arrangement, the latch 34 normally holds the pin stationary, whether engaged or disengaged, and when depressed, will release the pin for movement to the disengaged position by the spring 37. The control pin thus can be engaged simply by pushing down on a knob 39 on its upper end with sufficient force to overcome the holding power of the spring-loaded latch.

The lower sleeve 20 has a rearward extension 20 that passes from the mounting tube 15 around the inclined mounting bar 15b that carries the mounting sleeve in the illustrative scooter, and the motion-limiting recess 22 is secured to the upper side of the sleeve behind the mounting tube. As viewed in FIGS. 2 and 4, it can be seen that the stop member herein is a separate piece set into a notch in the top of the sleeve. It will be evident, however, that the recess may be formed in an integral rearward extension of the sleeve (not shown).

Figure 4A:
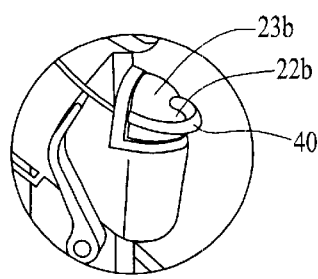
FIG. 4a is a fragmentary perspective view showing portions of an alternative embodiment of the lower control element.
Figure 4:
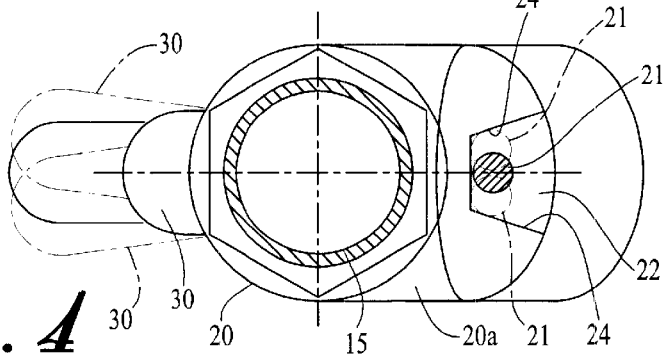
FIG. 4 is an enlarged cross-sectional view taken substantially along line 4—4 of FIG. 2 with turned positions of the parts shown in broken lines.

An alternative embodiment of the stop member is shown in FIG. 4a as an insert 23b that defines a stop recess 22b within a closed loop 40 of flexible material such as plastic that yields to a limited extent when engaged by the control pin 21. This provides a softened stop action, as compared to the abrupt stop action of the first embodiment. In all other respects, the alternative embodiment may be the same as the first embodiment.

From the foregoing, it will be seen that the present invention provides a simple, practical and effective steering control for scooters and other small-wheeled vehicles that can be installed as an after-market accessory or built into the vehicle as an item of original equipment. It also will be evidence that, while specific embodiments have been illustrated and described, various modifications and changes may be made without departing from the spirit and scope of the invention.

We claim:

1. In combination with a small-wheeled scooter having a body forming a footrest, a rear wheel rotatably mounted on one end of said body, a handlebar including an elongated steering post and a front wheel rotatably supported on said steering post, and a mounting tube mounted on the other end of said body and rotatably supporting said steering post to project upwardly from said other end and to turn about an upright axis for steering of the scooter, a safety steering control having:

a first control element comprising a first molded plastic sleeve fitted around said handlebar post immediately above said mounting tube and having first spaced longitudinal ribs on one side of said first sleeve and a longitudinal split between said ribs, fasteners for holding said ribs together to clamp the first control element in place around said handlebar, a hollow housing integral with said sleeve on a rear side thereof, a control pin mounted in said housing for up and down sliding and having an upper end portion disposed above the housing for access by a person on the footrest and a lower end portion projecting downwardly from the housing and movable between an extended position alongside said mounting tube and a retracted position above said extended position, and a manually operable slide latch mounted on said control element and operable when engaged to hold the control pin in different selected positions relative to the housing;

and a second control element comprising a second molded plastic sleeve fitted around said mounting tube and having second spaced longitudinal ribs on one side of said second sleeve and a longitudinal split between said second ribs, second fasteners for holding said second ribs together to clamp the second control element in place around said mounting tube, and an integral rearward extension on said second sleeve disposed beneath said control pin and having an upper side having an upwardly opening recess for receiving said lower end portion of said control pin when the latter is in the extended position;

said upwardly opening recess having side walls forming stops that are a preselected angular distance apart to limit turning of the control pin, and thus of the handlebar, when the pin is in the extended position, said pin being movable out of said recess in moving upwardly from said extended position toward said retracted position.

2. A safety steering control as defined in claim 1 further including a spring in said housing urging said pin yieldably toward said retracted position.

3. A safety steering control as defined in claim 2 further including a latch spring holding said latch in a latched position and yieldable to release the latch, thereby permitting the first-mentioned spring to move the control pin to the retracted position.

4. A safety steering control as defined in claim 1 wherein said sidewalls are angularly spaced, diverging, generally radially extending rigid walls of said recess.

5. A safety steering control as defined in claim 1 wherein said slide latch frictionally clamps said control pin in each selected position, and said control pin has a knob on its upper end to be pushed down toward the extended position.

6. For use with a small-wheeled scooter having a body forming a footrest, a handlebar including a steering post and a front wheel supported on said steering post, and a mounting tube mounted on said body and rotatably supporting said steering post to turn about an upright axis for steering of the scooter, a safety steering control having:

first and second mounting sleeves telescoped over and secured to said mounting post and said steering tube, respectively, said first sleeve having a housing on one side and said second sleeve having an extension thereon aligned with said housing when the front wheel is in a forwardly directed position;

a control pin mounted on said housing for sliding longitudinally of said steering post toward and away from said extension between engaged and disengaged positions, and said extension having a recess therein with angularly spaced sidewall on opposite sides of the extended position of said control pin, said control pin being withdrawn from said recess in said disengaged position;

a first spring in said housing urging said control pin yieldably toward said retracted position and out of said recess;

a slide latch engaging said control pin and movable between latched and released positions, said slide latch being operable in the latched position to resist movement of the control pin by said first spring and operable in the released position to permit manual movement of the control pin against said first spring;

and a second spring normally urgng said slide latch toward the latched position, said latch being manually movable out of the latched position to release said control pin.

7. A safety steering control as defined in claim 6 wherein said first and second mounting sleeves are integrally molded with said housing and said extension, respectively, and said sleeves are longitudinally split and formed with longitudinal ribs on opposite sides of the splits, and further including fasteners extending between said ribs for clamping the ribs around the handlebar post and the mounting tube.

* * * * *